United States Patent
Song et al.

(10) Patent No.: US 9,665,644 B1
(45) Date of Patent: May 30, 2017

(54) PERCEPTUAL CHARACTERISTIC SIMILARITY FOR ITEM REPLACEMENT IN MEDIA CONTENT

(71) Applicant: Google Inc., Mountain View, CA (US)

(72) Inventors: Yading Song, London (GB); Vivek Sharma, Sunnyvale, CA (US); Robert Steven Glickstein, San Rafael, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 14/589,527

(22) Filed: Jan. 5, 2015

(51) Int. Cl.
*G06F 17/00* (2006.01)
*G06F 17/30* (2006.01)
*G11B 27/02* (2006.01)

(52) U.S. Cl.
CPC .. *G06F 17/30743* (2013.01); *G06F 17/30386* (2013.01); *G11B 27/02* (2013.01)

(58) Field of Classification Search
CPC ........ G06F 17/30743; G06F 17/30026; G10H 2240/131; G10H 2240/145; H04N 21/4394; H04H 2201/90; H04H 60/37
See application file for complete search history.

(56) References Cited

U.S. PATENT DOCUMENTS

| | | | |
|---|---|---|---|
| 2008/0072741 A1* | 3/2008 | Ellis | G10H 1/0008 84/609 |
| 2009/0144325 A1* | 6/2009 | Chastagnol | G06Q 30/06 |
| 2011/0314995 A1* | 12/2011 | Lyon | G06F 17/30743 84/609 |
| 2014/0280272 A1* | 9/2014 | Choque | G06F 17/30017 707/758 |

* cited by examiner

*Primary Examiner* — Thomas Maung
(74) *Attorney, Agent, or Firm* — Byrne Poh LLP

(57) ABSTRACT

Systems and techniques for employing perceptual characteristic similarity for item replacement in media content are presented. The system can include an identification component, a matching component and a replacement component. The identification component identifies at least a portion of an item in a media file. The matching component determines a replacement item from a set of candidate items based on a comparison between perceptual characteristics associated with the item and corresponding perceptual characteristics associated with the set of candidate items. The replacement component replaces the item in the media file with at least a portion of the replacement item.

16 Claims, 12 Drawing Sheets

PERCEPTUAL CHARACTERISTIC SIMILARITY FOR ITEM REPLACEMENT IN MEDIA CONTENT

TECHNICAL FIELD

This disclosure relates generally to media content, and more specifically, to replacing an item included in media content.

BACKGROUND

Media content (e.g., user-generated media content, etc.) often times includes a song. In certain instances, it may be desirable to remove and/or change a song included in media content. One option to remove a song from media content is to mute the song. However, muting a song included in media content can diminish quality of the media content. Therefore, another option is to replace a song included media content with a different song. However, conventional techniques for replacing a song included media content with a different song often requires a user to select the different song from a list of hundreds of thousands of songs. Furthermore, it is often difficult and/or time consuming to replace a song included in media content with a similar song.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an identification component, a matching component and a replacement component. The identification component identifies at least a portion of an item in a media file. The matching component determines a replacement item from a set of candidate items based on a comparison between perceptual characteristics associated with the item and corresponding perceptual characteristics associated with the set of candidate items. The replacement component replaces the item in the media file with at least a portion of the replacement item.

Additionally, a non-limiting implementation provides for identifying at least a portion of an item included in a media file, determining a level of perceptual difference between the item and a previously determined item, selecting the previously determined item as a replacement item in response to a determination that the level of perceptual difference meets or exceeds a threshold level, and replacing the item included in the media file with the replacement item.

In accordance with another implementation, a non-transitory computer readable storage medium comprising computer-executable instructions, that in response to execution, cause a computing system to perform operations, comprising: identifying at least a portion of an audio item in a media file, determining a set of replacement audio items from a set of previously determined audio items based on a comparison between perceptual characteristics associated with the audio item and corresponding perceptual characteristics associated with the set of previously determined audio items, and replacing the audio item in the media file with a replacement audio item from the set of replacement audio items.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
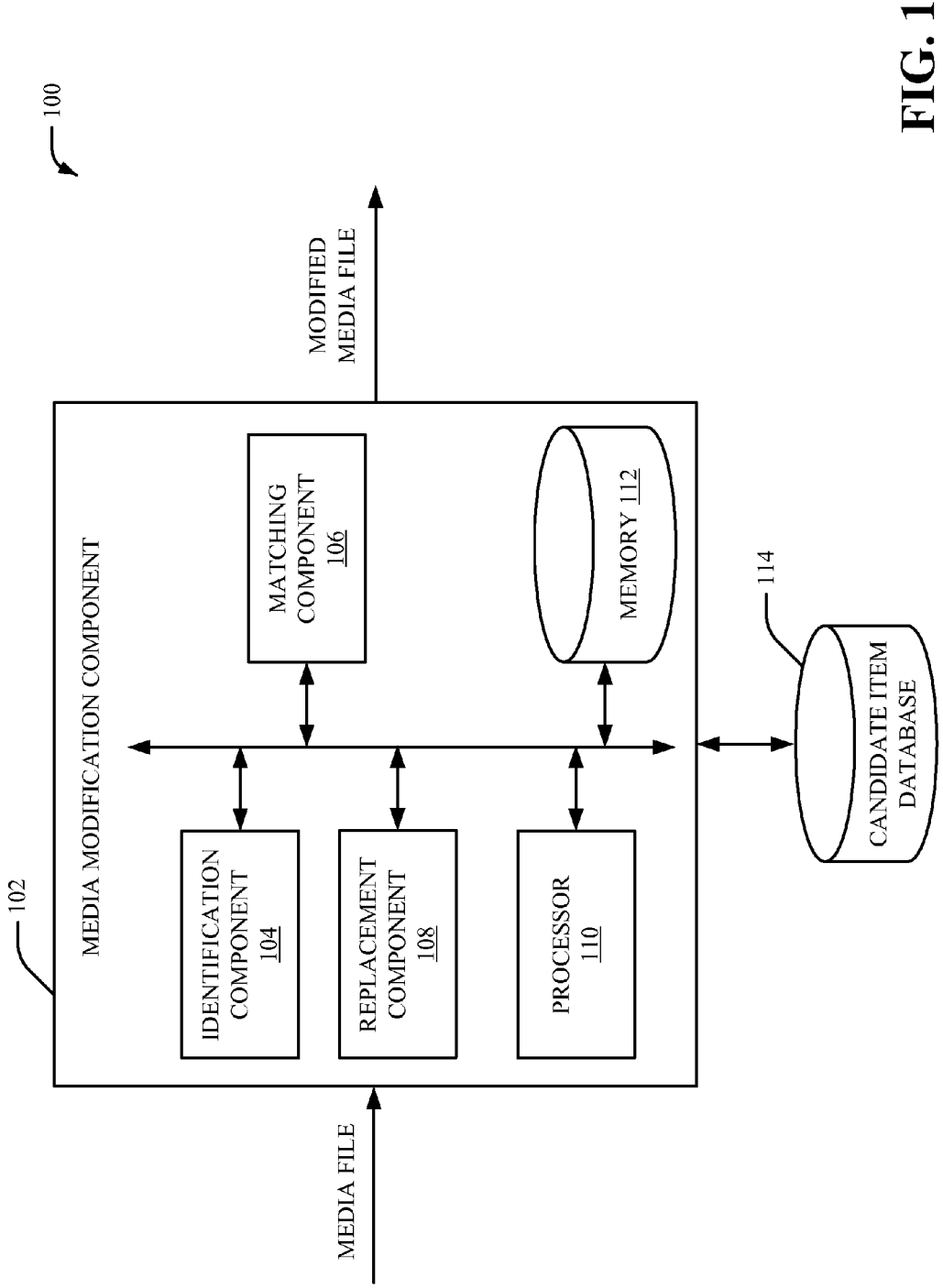
FIG. 1 illustrates a high-level block diagram of an example media modification component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio and/or video content) to a server (e.g., a media content server). The media content can then be delivered (e.g., streamed) to other users. Often times, uploaded media content (e.g., user-uploaded media content, user-generated media content, etc.) is associated with more than one type of media content (e.g., one or more songs selected by a user can be embedded in a video). The service providers typically provide the network infrastructure for the users, but very little else. Therefore, these service providers have very limited control over what media content is being uploaded and/or streamed by users, such as, e.g., copyrighted media content. Current copyright protection schemes compare uploaded media content to an index of validated and protected content. A copyright holder can upload the copyrighted media content as a reference. Additionally, the copyright holder can set a policy for dealing with matches (e.g., media content uploaded by a user that matches the copyrighted media content). If a match is made, a copyright claim is generated against the uploaded media content. For example, a media file (e.g., a video file) uploaded to a server (e.g., a media content server) by a user can include copyrighted media content (e.g., one or more copyrighted songs). Depending on the policy set by the copyright holder, the copyrighted media content may therefore need to be removed from the media file.

As such, in certain instances, it may be desirable to remove and/or change audio content (e.g., a song, a copyrighted song, etc.) included in media content. One conventional solution for removing audio content from a media file includes muting the audio content. However, muting audio content included in media content can diminish quality of the media content. An alternate solution includes replacing the audio content included in the media file with different audio content. However, conventional techniques for replacing audio content included media content with different audio content often requires a user to select the different audio content from a list of numerous audio content options. Moreover, it is often difficult and/or time consuming to replace audio content included in media content with similar audio content.

To that end, techniques for replacing an item included in media content are presented. For example, an item (e.g., audio content) included in a media file can be replaced with another item (e.g., other audio content). The item included in the media file can be, for example, audio content that meets a defined criteria (e.g., audio content included in the media file that is associated with a copyright claim, etc.). The other item can be, for example, audio content that does not meet the defined criteria (e.g., audio content that is not associated with a copyright claim, audio content associated with a grant to utilize the audio content in the media file, etc.). In an aspect, the other item can be determined based on a comparison between perceptual characteristics (e.g., timbre, tempo, dynamics, harmony and/or other perceptual characteristics) associated with audio content of the item and perceptual characteristics (e.g., timbre, tempo, dynamics, harmony and/or other perceptual characteristics) associated with audio content of the other item. In one example, frequency coefficient information (e.g., Mel Frequency Cepstral Coefficient (MFCC) information) and/or auditory imagery information (e.g., Stabilized Auditory Image (SAI) information) can be employed to determine the other item.

Referring initially to FIG. 1, there is illustrated an example system 100 that replaces an item (e.g., audio content) in media content with another item (e.g., other audio content), according to an aspect of the subject disclosure. In one example, the system 100 can be implemented on or in connection with at least one server (e.g., at least one server that hosts and/or modifies user-uploaded media content). The system 100 can be employed by various systems, such as, but not limited to media content systems, media sharing systems, media editing systems, media recommendation systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

Specifically, the system 100 can provide a media modification feature with an identification feature (e.g., identification component 104), a matching feature (e.g., matching component 106) and a replacement feature (e.g., replacement component 108) that can be utilized in and/or in connection with, for example, a media application (e.g., a media sharing application, a media recommendation application, etc.). The identification feature can identify at least a portion of an item in a media file. The matching feature can determine a replacement item from a set of candidate items based on a comparison between perceptual characteristics associated with the item and corresponding perceptual characteristics associated with the set of candidate items. The replacement feature can replace the item in the media file with at least a portion of the replacement item.

In particular, the system 100 can include a media modification component 102. In FIG. 1, the media modification component 102 includes an identification component 104, a matching component 106 and a replacement component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The media modification 102 (e.g., the identification component 104) can receive a media file (e.g., MEDIA FILE shown in FIG. 1). In one example, the media file can be associated with and/or stored on at least one server (e.g., a remote server, a media content server, etc.) prior to being received by the media modification 102 (e.g., the identification component 104). In another example, a user device can transmit (e.g., directly transmit or indirectly transmit) the media file to the media modification 102 (e.g., the identification component 104). The media file can be, for example, an uploaded media file (e.g., a media file uploaded to a media sharing platform, a media file uploaded to at least one server, etc.). A user device can include a computer, a laptop computer, a mobile device, a handheld device, a cellular phone (e.g., a smartphone), a tablet, an interactive television, an internet-connected television, a set-top box, a streaming media device, a wearable computing device, a camera, a personal digital assistant (PDA), an electronic reader (e-reader), a portable computing device, a gaming device, another type of media capable device, etc. The media file can include one or more types of media content. For example, the media file can include video (e.g., a video file, a video clip, a video sample, etc.) and/or audio (e.g., an audio file, an audio clip, an audio sample, a music file, a music clip, a music sample, a song, etc.). It is to be appreciated that the media file can be in any recognizable media file format (e.g., video file format and/or audio file format), codec compression format, etc.

The identification component 104 can identify at least a portion of an item (e.g., audio content, an audio item, etc.) in the media file. For example, the identification component 104 can identify at least a portion of a song associated with and/or included in the media file. The item can be embedded in the media file. The item can be, in one example, an item that meets certain criteria with respect to a content claim (e.g., a copyright claim). For example, the item can be associated with a content claim that limits use of the item (e.g., the item can be copyrighted content, the item can be a copyrighted song, etc.).

In certain implementations, the item can be identified by the identification component 104 based at least in part on a previously identified partial segment of the item. The identification component 104 can store and/or access, for example, a library of identified items (e.g., previously identified items, previously determined items, etc.). Therefore, the library can be implemented as a cross-reference to identify the item. The library can be stored, for example, on a server in communication with the identification component 104. It is to be appreciated that the identification component 104 can employ one or more audio fingerprint techniques and/or one or more hashing schemes to identify the item. In an aspect, the identification component 104 can identify each item included in the media file and/or compare each item included in the media file to an index of claimed items (e.g., validated and protected items). For example, the identification component can identify each song included in a video file and/or compare each song included in the video file to an index of claimed songs (e.g., copyrighted songs).

The matching component 106 can determine a replacement item from a set of candidate items (e.g., a set of candidate audio content, a set of candidate audio items, a set of previously determined items, etc.). For example, the set of candidate items can be stored in a candidate item database 114 associated with the media modification component 102. The set of candidate items can be, for example, items that are not associated with a copyright claim (e.g., candidate items associated with a grant to utilize the candidate items in the media file). The matching component 106 can determine the replacement item from the set of candidate items based on a comparison between perceptual characteristics associated with the item and corresponding perceptual characteristics associated with the set of candidate items. Perceptual characteristics can be associated with content (e.g., audio content) of the item. Perceptual characteristics associated with the item can include, but is not limited to, timbre characteristics associated with the item (e.g., timbre of audio content of the item), tempo characteristics associated with the item (e.g., tempo of audio content of the item), harmonic characteristics associated with the item (e.g., harmony of audio content of the item), dynamic characteristics associated with the item (e.g., dynamics of audio content of the item) and/or other elements associated with audio content of the item. Similarly, corresponding perceptual characteristics associated with the set of candidate items can include, but is not limited to, timbre characteristics associated with the set of candidate items (e.g., timbre of audio content of the set of candidate items), tempo characteristics associated with the set of candidate items (e.g., tempo of audio content of the set of candidate items), harmonic characteristics associated with the set of candidate items (e.g., harmony of audio content of the set of candidate items), dynamic characteristics associated with the set of candidate items (e.g., dynamics of audio content of the set of candidate items) and/or other elements associated with audio content of the set of candidate items.

For example, timbre characteristics associated with the item (e.g., timbre of audio content of the item) can be compared to timbre characteristics associated with each candidate item in the set of candidate items (e.g., timbre of audio content of each candidate item in the set of candidate items). Additionally or alternatively, tempo characteristics associated with the item (e.g., tempo of audio content of the item) can be compared to tempo characteristics associated with each candidate item in the set of candidate items (e.g., tempo of audio content of each candidate item in the set of candidate items). Additionally or alternatively, harmonic characteristics associated with the item (e.g., harmony of audio content of the item) can be compared to harmonic characteristics associated with each candidate item in the set of candidate items (e.g., harmony of audio content of each candidate item in the set of candidate items). Additionally or alternatively, dynamic characteristics associated with the item (e.g., dynamics of audio content of the item) can be compared to dynamic characteristics associated with each candidate item in the set of candidate items (e.g., dynamics of audio content of each candidate item in the set of candidate items). Accordingly, the matching component 106 can compare the item to each candidate item in the set of candidate items based on perceptual characteristics. In an aspect, the matching component 106 can determine the replacement item from the set of candidate items based on a weighted average of at least a first perceptual characteristic (e.g., timbre characteristics, etc.) and a second perceptual characteristic (e.g., tempo characteristics, etc.) associated with the item and a candidate item from the set of candidate items.

To facilitate determining a replacement item from a set of candidate items, the matching component 106 can extract and/or determine frequency coefficients associated with audio content of the item. For example, the matching component 106 can extract and/or determine Mel-Frequency Cepstral Coefficients (MFCCs) associated with audio content of the item. The MFCCs can be associated with amplitudes of a spectrum (e.g., an audio spectrum) derived, for example, based on at least a Fourier transform applied to audio content of the item and/or pitch comparisons of the audio content of the item determined based on the Fourier transform. The matching component 106 can also extract and/or determine other frequency coefficients associated with audio content of the set of candidate items. For example, the matching component 106 can extract and/or determine other MFCCs associated with audio content of the set of candidate items. The other MFCCs can be associated with amplitudes of a spectrum (e.g., an audio spectrum) derived, for example, based on at least a Fourier transform applied to audio content of the set of candidate items and/or pitch comparisons of the audio content of the set of candidate items determined based on the Fourier transform. Therefore, the matching component 106 can additionally or alternatively determine the replacement item from the set of candidate items based on a comparison between frequency coefficients (e.g., MFCC information) associated with the item and other frequency coefficients (e.g., other MFCC information) associated with the set of candidate items.

Additionally or alternatively, the matching component 106 can extract and/or determine auditory imagery associated with audio content of the item. For example, the matching component 106 can extract and/or determine a Stabilized Auditory Image (SAI) and/or SAI features associated with audio content of the item. The SAI and/or SAI features can be generated based on strobe points and/or a strobed temporal integration process associated with audio content of the item. The matching component 106 can also extract and/or determine other auditory imagery associated with audio content of each candidate item from the set of candidate items. For example, the matching component 106 can extract and/or determine another SAI and/or other SAI features associated with audio content of each candidate item from the set of candidate items. The other SAI and/or other SAI features can be generated based on strobe points and/or a strobed temporal integration process associated with audio content of each candidate item from the set of candidate items. The matching component 106 can therefore additionally or alternatively determine the replacement item from the set of candidate items based on a comparison between auditory imagery information associated with the item and other auditory imagery information associated with the set of candidate items. In an aspect, the matching component 106 can determine the replacement item from the set of candidate items based on a weighted average of frequency coefficients (e.g., MFCC information) and auditory imagery information (e.g., SAI information) associated with the item and each candidate item from the set of candidate items. Accordingly, scoring of frequency coefficients (e.g., MFCC information) and auditory imagery information (e.g., SAI information) can be employed to determine the replacement item from the set of candidate items.

In a non-limiting example, the matching component 106 can pair the item included in the media file to each candidate item included in the set of candidate items. The matching component 106 can also determine at least first perceptual characteristics (e.g., timbre characteristics, etc.) and second characteristics (e.g., tempo characteristics, etc.) associated with the item included in the media file, as well as other first perceptual characteristics (e.g., timbre characteristics, etc.) and other second characteristics (e.g., tempo characteristics, etc.) associated with each candidate item included in the set of candidate items. For each pair associated with the item and a candidate item from the set of candidate items, the matching component 106 can compute a first distance between the first perceptual characteristics and the other first perceptual characteristics. Additionally, for each pair associated with the item and a candidate item from the set of candidate items, the matching component 106 can compute a second distance between the second perceptual characteristics and the other second perceptual characteristics. Then, the matching component 106 can determine a similarity distance by combining the first distance and the second distance. In one example, the similarity distance can be a weighted average of the first distance and the second distance (e.g., the first distance can be combined with a weighted version of the second distance to form the similarity distance, a weighted version of the first distance can be combined with the second distance to form the similarity distance, etc.). A candidate item associated with a lowest similarity distance can be provided as a replacement item.

In an aspect, the matching component 106 can add a replacement item to a set of replacement items. For example, the matching component 106 can determine more than one replacement item from the set of candidate items. The set of replacement items can be a set of recommended replacement items (e.g., a set of recommended audio content) to replace the item in the media file. In one example, the set of replacement items can be a set of songs that sound similar to a song (e.g., the item) included in the media file. It is to be appreciated that the matching component 106 can additionally employ other information to determine a replacement item from a set of candidate items, such as but not limited to user ratings, contextual metadata, user comments, etc.

The replacement component 108 can replace the item in the media file with at least a portion of the replacement item to generate a modified media file (e.g., MODIFIED MEDIA FILE shown in FIG. 1). For example, the replacement component 108 can remove the item from the media file. It is to be appreciated that the replacement component 108 can implement one or more signal processing algorithms to remove the item from the media file. The replacement component 108 can additionally add at least a portion of the replacement item to the media file (e.g., the replacement component 108 can embed at least a portion of the replacement item into the media file). Therefore, the item (e.g., a song) removed from the media file via the media modification component 102 can be replaced with the replacement item (e.g., another song, a cover version of the song, a re-recorded version of the song, a non-copyrighted version of the song, etc.). The replacement item added to the media file can be, for example, a replacement item from the set of replacement items that is most similar to the item in the media file. In an aspect, the replacement component 108 can temporally synchronize at least the portion of the replacement item and the media file based on an interval of time associated with at least the portion of the item. In another aspect, the replacement component 108 can re-process the media file to facilitate generating the modified media file that includes the replacement item. The replacement component 108 can upload to and/or store the modified media file on a remote server (e.g., a media content server). Additionally or alternatively, the replacement component 108 can transmit the modified media file for display on a user device.

It is to be appreciated that the content-based techniques employed by the system 100 to replace an item included in a media file can be integrated into any existing media sharing system, media modification system and/or media recommendation system. It is also to be appreciated that content-based techniques employed by the system 100 can be applied to other media systems, such as but not limited to, media classification systems (e.g., emotion recognition systems, genre classification systems, scene detection systems, etc.), personalized media discovery systems, etc.

While FIG. 1 depicts separate components in system 100, it is to be appreciated that the components may be implemented in a common component. In one example, the identification component 104, the matching component 106 and/or the replacement component 108 can be included in a single component. Further, it can be appreciated that the design of system 100 can include other component selections, component placements, etc., to replace an item included in media content.

Figure 2:
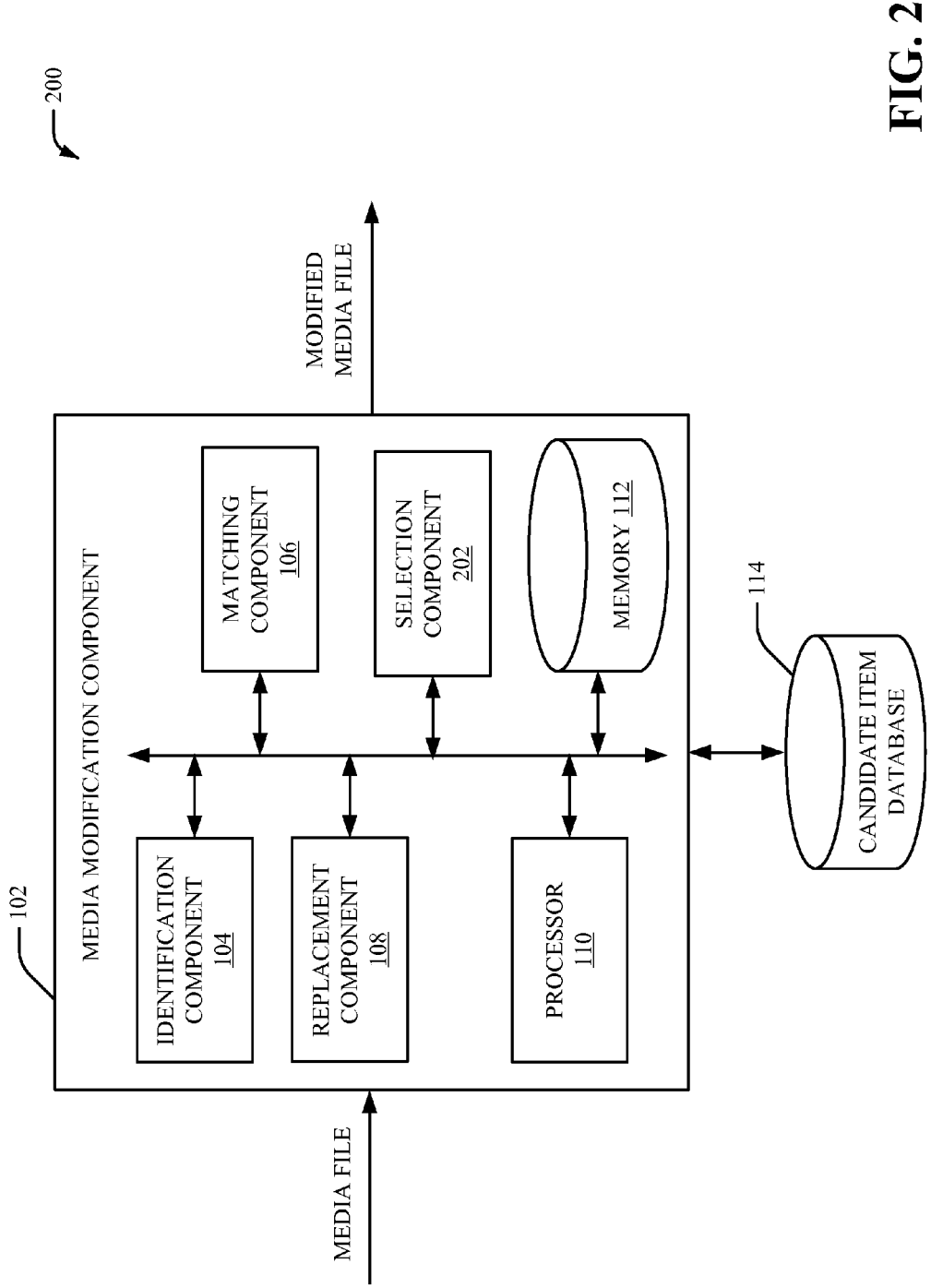
FIG. 2 illustrates a high-level block diagram of another example media modification component, in accordance with various aspects and implementations described herein.

Referring now to FIG. 2, there is illustrated a non-limiting implementation of a system 200 in accordance with various aspects and implementations of this disclosure. The system 200 includes the media modification component 102. The media modification component 102 includes the identification component 104, the matching component 106, the replacement component 108 and a selection component 202. The selection component 202 can receive user input associated with selection of the replacement item. For example, the user input can be associated with selection of the replacement items from a set of replacement items (e.g., a set of recommended replacement items) determined by the matching component 106. Furthermore, the replacement component 108 can replace the item in the media file with at least the portion of the replacement item based on the selection. In an aspect, the selection component 202 can be implemented in connection with a user interface on a user device and/or a cloud-based video editor.

Figure 3:
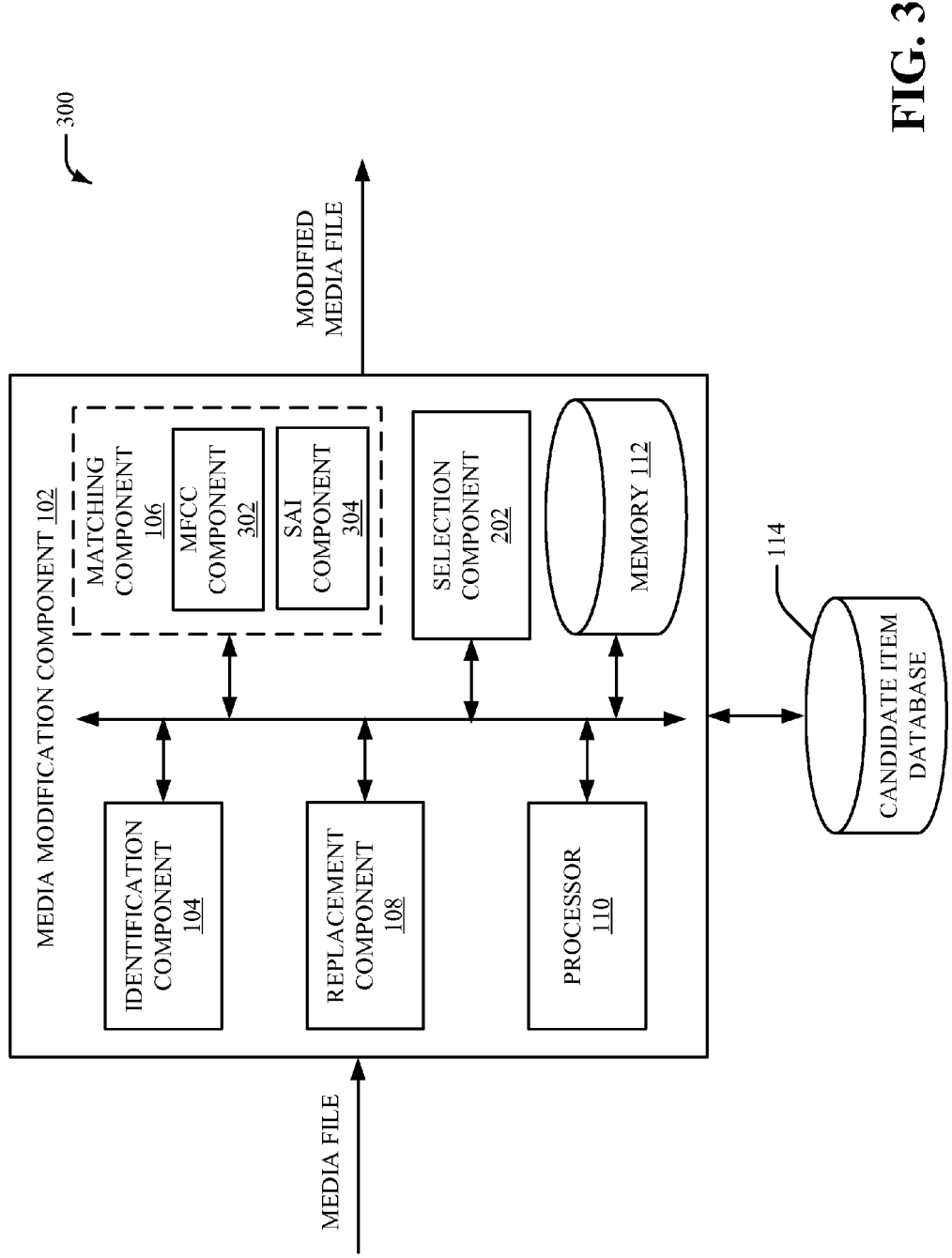
FIG. 3 illustrates a high-level block diagram of yet another example media modification component, in accordance with various aspects and implementations described herein.

Referring now to FIG. 3, there is illustrated a non-limiting implementation of a system 300 in accordance with various aspects and implementations of this disclosure. The system 300 includes the media modification component 102. The media modification component 102 includes the identification component 104, the matching component 106, the replacement component 108 and/or the selection component 202. The matching component 106 includes a Mel-Frequency Cepstral Coefficients (MFCC) component 302 and/or a Stabilized Auditory Image (SAI) component 304. The matching component 106 can include the MFCC component 302 and the SAI component 304 to facilitate similarity computation associated with the item included in the media file. Therefore, the matching component 106 can perform content-based matching based on audio which combines perceptually significant features associated with the item included in the media file and/or the set of candidate items.

The MFCC component 302 can generate frequency coefficients (e.g., MFCCs) and/or information associated with frequency coefficients based on audio content of the item included in the media file. The frequency coefficients (e.g., MFCCs) can be associated with amplitudes of a spectrum derived, for example, based on at least a Fourier transform applied to audio content of the item and/or pitch comparisons of the audio content of the item determined based on the Fourier transform. The MFCC component 302 can determine timbre associated with audio content of the item included in the media file. The MFCC component 302 can also recognize speech associated with audio content of the item included in the media file. For example, the MFCC component 302 can provide genre classification (e.g., musical genre classification), emotion recognition and/or other audio similarity measures associated with audio content of the item included in the media file. Similarly, the MFCC component 302 can generate other frequency coefficients (e.g., other MFCCs) and/or other information associated with frequency coefficients based on audio content associated with the set of candidate items. In one example, the other frequency coefficients (e.g., other MFCCs) associated with the set of candidate items can be previously determined by the MFCC component 302 and/or another component. Additionally, the other frequency coefficients (e.g., other MFCCs) associated with the set of candidate items can be stored in the candidate item database 114.

The MFCC component 302 can also determine a distance based on frequency coefficients (e.g., MFCCs) and/or frequency coefficient information associated with the item and the set of candidate items. For example, for each item/candidate item pair, a distance (e.g., MFCC distance) between frequency coefficients (e.g., MFCCs) of the item and other frequency coefficients (e.g., other MFCCs) of a candidate item can be determined by the MFCC component 302. The distance (e.g., MFCC distance) between frequency coefficients (e.g., MFCCs) of the item and other frequency coefficients (e.g., other MFCCs) of a candidate item can be a cosine distance. However, it is to be appreciated that the distance (e.g., MFCC distance) between frequency coefficients (e.g., MFCCs) of the item and other frequency coefficients (e.g., other MFCCs) of a candidate item can be a different type of distance measure, such as but not limited to, Euclidean distance, correlation distance, Hamming distance, etc.

The SAI component 304 can generate and/or determine SAI features associated with audio content of the item. The SAI features can be generated based on strobe points and/or a strobed temporal integration process associated with audio content of the item. The SAI component 304 can determine tempo and/or pitch associated with audio content of the item included in the media file. The SAI component 304 can also provide and/or preserve temporal information associated with audio content of the item included in the media file. For example, the SAI component 304 can provide temporal information associated with the SAI features generated based on audio content of the item included in the media file. Similarly, the SAI component 304 can generate other SAI features based on audio content associated with the set of candidate items. In one example, the other SAI features associated with the set of candidate items can be previously determined by the SAI component 304 and/or another component. Additionally, the other SAI features associated with the set of candidate items can be stored in the candidate item database 114.

The SAI component 304 can also determine a distance based on SAI features associated with the item and the set of candidate items. For example, for each item/candidate item pair, another distance (e.g., SAI distance) between SAI features of the item and other SAI features of a candidate item can be determined by the SAI component 304. The other distance (e.g., SAI distance) between SAI features of the item and other SAI features of a candidate item can be a cosine distance. However, it is to be appreciated that the other distance (e.g., SAI distance) between SAI features of the item and other SAI features of a candidate item can be a different type of distance measure, such as but not limited to, Euclidean distance, correlation distance, Hamming distance, etc.

In an aspect, for each item/candidate item pair, the matching component 106 can generate a similarity distance based on the distance (e.g., MFCC distance) determined by the MFCC component 302 and the other distance (e.g., SAI distance) determined by the SAI component 304. The similarity distance can be, for example, a weighted average of the distance (e.g., MFCC distance) determined by the MFCC component 302 and the other distance (e.g., SAI distance) determined by the SAI component 304. In one example, the similarity distance can be equal to a combination of the distance (e.g., MFCC distance) determined by the MFCC component 302 and a weighted version of the other distance (e.g., SAI distance) determined by the SAI component 304 (e.g., a weight can be applied to the other distance determined by the SAI component 304). In another example, the similarity distance can be equal to a combination of a weighted version of the distance (e.g., MFCC distance) determined by the MFCC component 302 and the other distance (e.g., SAI distance) determined by the SAI component 304 (e.g., a weight can be applied to the distance determined by the MFCC component 302). Similarity distance determined by the matching component 106 can be employed to select a candidate item (e.g., a candidate item from the set of candidate items) as a replacement item for the item included in the media file.

Figure 4:
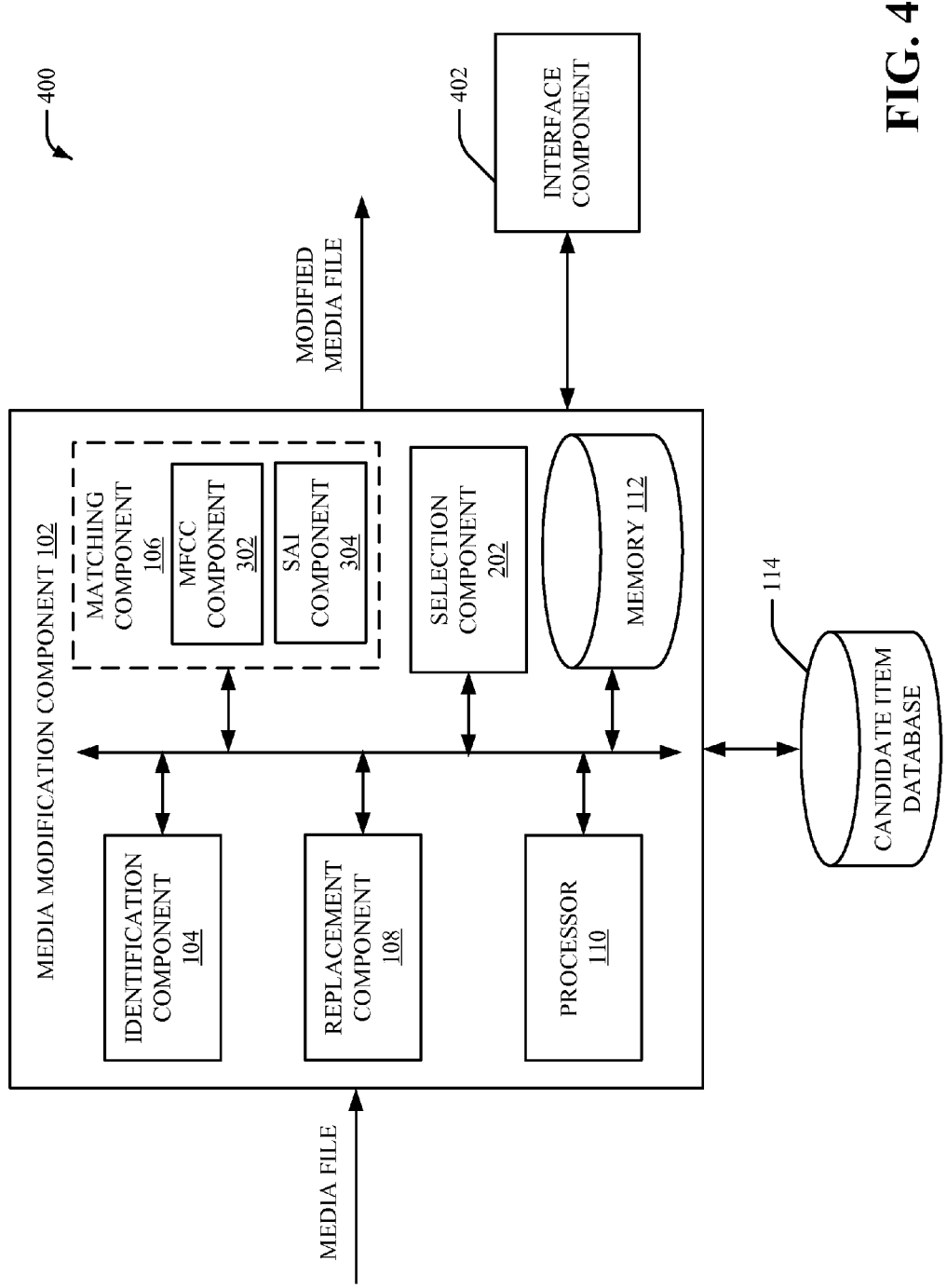
FIG. 4 illustrates a high-level block diagram of a media modification component in connection with an interface component, in accordance with various aspects and implementations described herein.

Referring now to FIG. 4, there is illustrated a non-limiting implementation of a system 400 in accordance with various aspects and implementations of this disclosure. The system

400 the media modification component 102 and an interface component 402. The media modification component 102 includes the identification component 104, the matching component 106, the replacement component 108 and/or the selection component 202. The matching component 106 includes the MFCC component 302 and/or the SAI component 304. In an implementation, the interface component 402 can be implemented separate from the media modification component 102. In another implementation, the media modification component 102 can include the interface component 402.

The interface component 402 can generate a user interface (e.g., a display) to present a replacement item determined by the matching component 106 and/or to present information (e.g., textual information, metadata, etc.) associated with a replacement item determined by the matching component 106. The interface component 402 can additionally or alternatively present and/or generate audio output associated with a replacement item determined by the matching component 106. The system 400 (e.g., the interface component 402) can be integrated with a cloud-based video editor. In an aspect, the interface component 402 can present a user with an option to remove the item from the media file. For example, the interface component 402 can generate a user interface (e.g., a display) for the user to allow the user to view information associated with the item included in the media file. Additionally, the interface component 402 can present a user with a replacement item or a set of replacement items determined by the matching component 106. In one example, the replacement item included in the modified media file can be selected by the user (e.g., the user can select the replacement item from the set of replacement items presented to the user) via the interface component 402. The interface component 402 can additionally present the user with the modified media file that includes the replacement item via a user interface (e.g., a display).

The interface component 402 can also present the user with information (e.g., a notification, an email notification, etc.) regarding policies (e.g., ownership and/or licensing policies) for the item included the media file. In one example, the interface component 402 provides a user with a list of one or more already-existing policy outcomes of not removing the item from the media file. For example, the interface component 402 can present to a user an already-existing policy outcome of leaving one or more copyrighted songs in a video (e.g., a video file). An already-existing policy outcome can include, but is not limited to, muting an entire audio track for a video, blocking playback of a video in one or more geographical locations (e.g., countries), not allowing a video to display advertisements, etc. Additionally, the interface component 402 can notify a user that the already-existing policy outcome(s) can be reversed by replacing the item in the media file with the a replacement item included in the set of replacement items. For example, the interface component 402 can present a notification to a user which states that the media file is blocked in one or more countries due to the presence of the item (e.g., a copyrighted song). Additionally, the notification can state that replacement of the item included in the media file with the a replacement item from the set of replacement items will result in the media file being unblocked globally (e.g., unblocked in each of the one or more countries).

Accordingly, the system 400, as well as other systems disclosed herein, can be implemented as a content-based similarity system to provide a user perceptually similar tracks if copyright claimed content is found in and/or associated with the media file. By providing perceptually similar content to a user with respect to copyright claimed content, a user can select from a set of similar content rather than manually searching for content to replace the copyright claimed content. Difficulty and/or time spent searching for proper content to replace the copyright claimed content can therefore be reduced.

Figure 5:
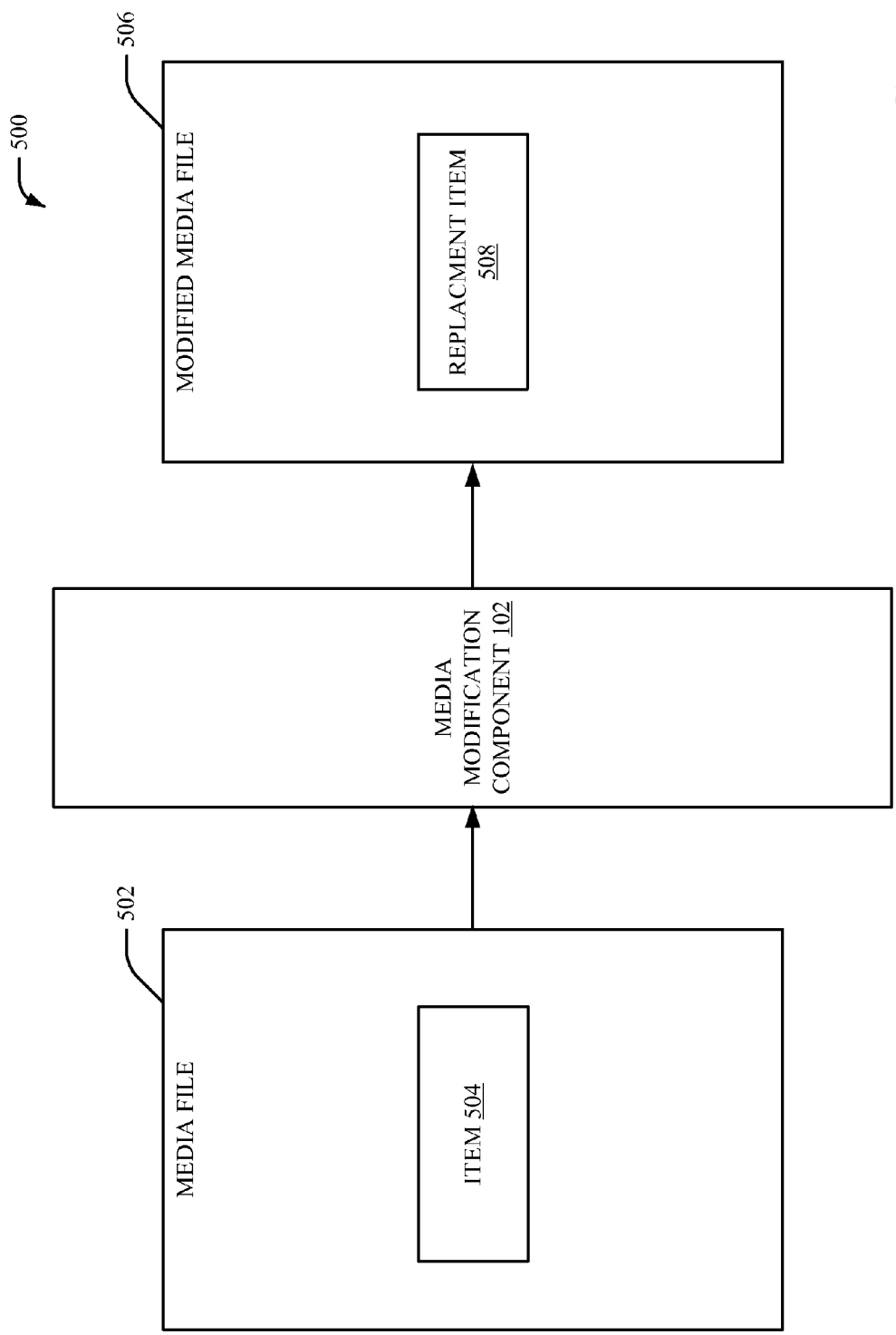
FIG. 5 illustrates an example system for replacing an item in a media file, in accordance with various aspects and implementations described herein.

Referring to FIG. 5, there is illustrated a non-limiting implementation of a system 500 in accordance with various aspects and implementations of this disclosure. The system 500 includes a media file 502. For example, the media file 502 can be a video file. The media file 502 can include at least an item 504. For example, the item 504 can be audio content (e.g., a song). However, it is to be appreciated that the item 504 can be other media content (e.g., video content, etc.). The media modification component 102 can receive the media file 502. In response to receiving the media file 502, the media modification component 102 (e.g., the media modification component 102 that includes the identification component 104, the matching component 106, the replacement component 108 and/or the selection component 202) can generate a modified media file 506. The modified media file 506 can be a modified version of the media file 502. For example, the modified media file 506 can be a modified video file. The modified media file 506 can include at least a replacement item 508 (e.g., the item 504 can be replaced with the replacement item 508). The replacement item 508 can be replacement audio content (e.g., a replacement song) for the item 504. However, it is to be appreciated that the replacement item 508 can be other replacement media content (e.g., replacement video content, etc.). In an aspect, the replacement item 508 can be a candidate item included in a set of candidate items (e.g., a set of candidate items stored in the candidate item database 114). The set of candidate items can be a set of candidate audio content (e.g., a set of candidate songs) that can replace the item 504 in the media file 502. The replacement item 508 can be an item (e.g., audio content, a song, etc.) that is not associated with a copyright claim. For example, the replacement item 508 can be associated with a grant to utilize the replacement item 508 in order to replace the item 504 in the media file 502 (e.g., the replacement item 508 can be associated with a grant to generate the modified media file 506 with the replacement item 508). Accordingly, the modified media file 506 can be implemented without the item 504. In an example where the media file 502 is a video file and the item 502 and the replacement item 508 are associated with audio content, the modified media file 506 can be associated with the same video content as the media file 502.

In an aspect, the replacement item 508 can be selected from a set of candidate items (e.g., a set of candidate items stored in the candidate item database 114) based on a comparison between perceptual characteristics associated with the item 504 and corresponding perceptual characteristics associated with the set of candidate items. Perceptual characteristics can include, but are not limited to, timbre characteristics, tempo characteristics, harmonic characteristics, dynamic characteristics and/or other perceptual characteristics. In one example, the replacement item 508 can be selected from a set of candidate items (e.g., a set of candidate items stored in the candidate item database 114) based on MFCC information and/or SAI information associated with the item 504 and the set of candidate items.

Figure 6:
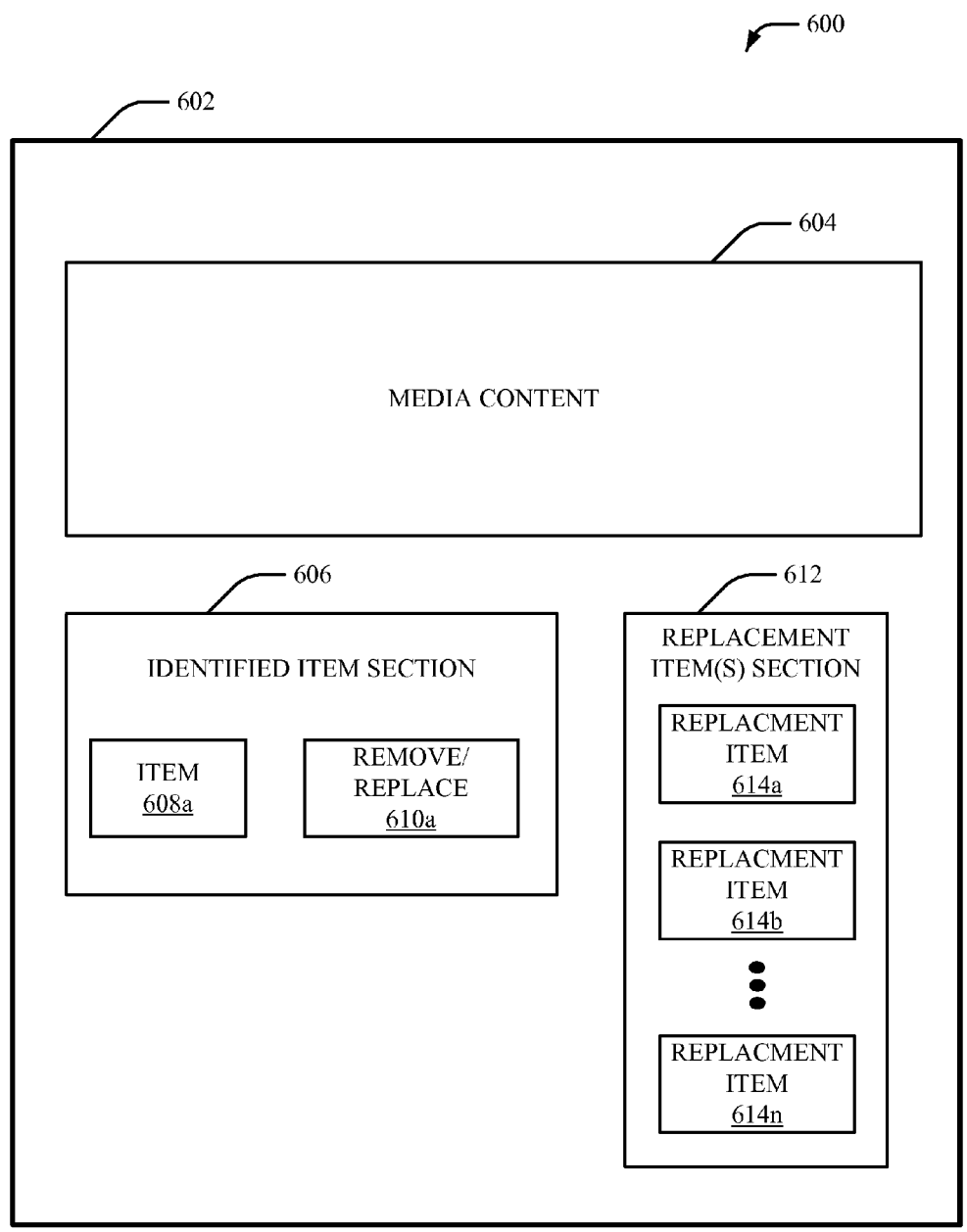
FIG. 6 illustrates an example user interface, in accordance with various aspects and implementations described herein.

Referring to FIG. 6, there is illustrated a non-limiting implementation of a system 600, in accordance with various aspects and implementations of this disclosure. In an aspect, the system 600 can be associated with the interface component 402. The system 600 illustrates an example webpage 602 (e.g., a user interface to allow a user to replace an item embedded in media content 604). The webpage 602 can be presented on a display of a user device (e.g., a user device associated with a user that generated and/or uploaded the media content 604). The user device can include a computer, a laptop computer, a mobile device, a handheld device, a cellular phone (e.g., a smartphone), a tablet, an interactive television, an internet-connected television, a set-top box, a streaming media device, a wearable computing device, a camera, a personal digital assistant (PDA), an electronic reader (e-reader), a portable computing device, a gaming device, another type of media capable device, etc. In one example, the media content 604 can be a video and the webpage 602 can be a video hosting website. The media content 604 can be associated with, for example, a media file received by the media modification component 102. The webpage 602 can include the media content 604, an identified item section 606 and a replacement item section(s) 612. The identified item section 606 can include an item (e.g., a song) 608 and a remove/replace button 610. As such, a user can view information associated with the item 608 embedded in the media content 604. The item 608 can be, for example, an item identified by the identification component 104. The user can remove the item 608 from the media content 604 and/or replace the item 608 with a replacement item included in the replacement item section(s) 612 by selecting the remove/replace button 610. The replacement item(s) section 612 can present the user with one or more replacement items (e.g., replacement songs) 614a-n. Therefore, the user can choose to replace the items 608 included in the media content 604 with a replacement item 614a-n included in the replacement item(s) section 612. The one or more replacement items 614a-n included in the replacement item section(s) 612 can be associated with information (e.g., textual information, metadata, etc.) and/or audio output for the one or more replacement items 614a-n. In an aspect, the webpage 602 can additionally or alternatively present modified media content that includes a replacement item (e.g., a replacement item presented via the replacement item section(s) 612 and/or selected from the one or more replacement items 614a-n). The replacement items 614a-n can be determined, for example, by the matching component 106. It is to be appreciated that the webpage 602 is merely an example. Therefore, the location and/or content of the media content 604, the identified item section 606 and/or the replacement item(s) section 612 can be varied. Furthermore, the webpage 602 can include other features, content and/or functionalities not shown in FIG. 6. It is also to be appreciated that the identified item section 606 can include more than one item (e.g., more than one item that is identified in the media content 604).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 7:
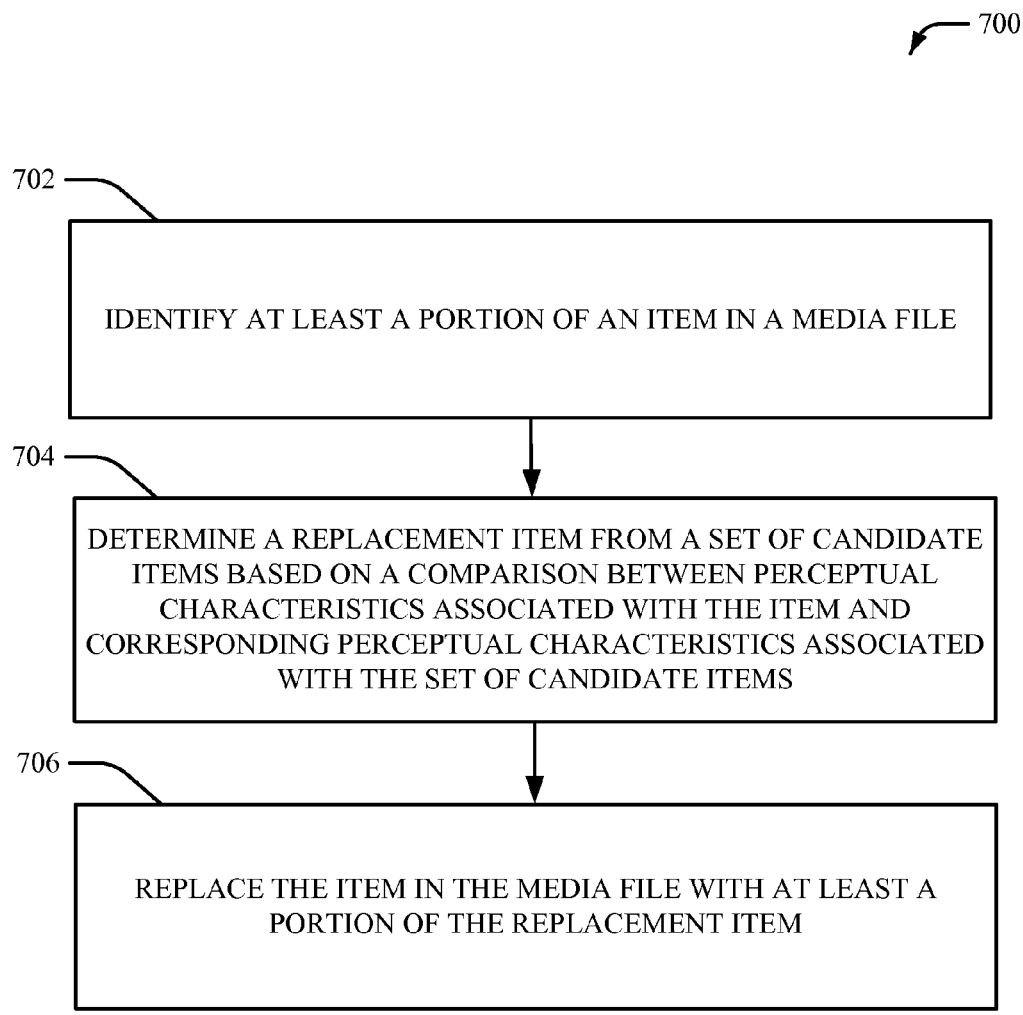
FIG. 7 depicts a flow diagram of an example method for replacing an item in a media file, in accordance with various aspects and implementations described herein.

Referring to FIG. 7, there illustrated is a methodology 700 for replacing an item in a media file, according to an aspect of the subject innovation. As an example, methodology 700 can be utilized in various applications, such as, but not limited to, media content systems, media sharing systems, media editing systems, media recommendation systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, etc. At 702, at least a portion of an item in a media file is identified (e.g., by an identification component 104). For example, an item (e.g., audio content) embedded in a media file (e.g., a video file) can be identified.

At 704, a replacement item from a set of candidate items is determined (e.g., by matching component 106) based on a comparison between perceptual characteristics associated with the item and corresponding perceptual characteristics associated with the set of candidate items. For example, timbre characteristics associated with the item (e.g., timbre of audio content of the item) can be compared to timbre characteristics associated with each candidate item in the set of candidate items (e.g., timbre of audio content of each candidate item in the set of candidate items). Additionally or alternatively, tempo characteristics associated with the item (e.g., tempo of audio content of the item) can be compared to tempo characteristics associated with each candidate item in the set of candidate items (e.g., tempo of audio content of each candidate item in the set of candidate items). Additionally or alternatively, harmonic characteristics associated with the item (e.g., harmony of audio content of the item) can be compared to harmonic characteristics associated with each candidate item in the set of candidate items (e.g., harmony of audio content of each candidate item in the set of candidate items). Additionally or alternatively, dynamic characteristics associated with the item (e.g., dynamics of audio content of the item) can be compared to dynamic characteristics associated with each candidate item in the set of candidate items (e.g., dynamics of audio content of each candidate item in the set of candidate items). In an aspect, the replacement item can be determined based on a weighted average of at least a first perceptual characteristic (e.g., timbre characteristics) and a second perceptual characteristic (e.g., tempo characteristics) associated with the item and a candidate item from the set of candidate items.

In a non-limiting implementation, frequency coefficient (e.g., MFCC) information associated with the item can be compared to frequency coefficient (e.g., MFCC) information associated with each candidate item in the set of candidate items. Additionally, auditory imagery (e.g., SAI) information associated with the item can be compared to auditory imagery (e.g., SAI) information associated with each candidate item in the set of candidate items. The replacement item can be determined, for example, based on a weighted average of frequency coefficient (e.g., MFCC) information and auditory imagery (e.g., SAI) information associated with the item the set of candidate items.

At 706, the item in the media file is replaced with at least a portion of the replacement item (e.g., by a replacement component 108). For example, the replacement item can be a candidate item from the set of candidate items that is determined to be most similar to the item in the media file based on the comparison between the perceptual characteristics associated with the item and the corresponding perceptual characteristics associated with the set of candidate items. In an aspect, the replacement item, information associated with the replacement item and/or a modified media file that includes the replacement item can be presented to a user (e.g., a user that generated and/or uploaded the media file) via a user device. In one example, the replacement item can be selected by a user from a set of replacement items presented on a user device.

Figure 8:
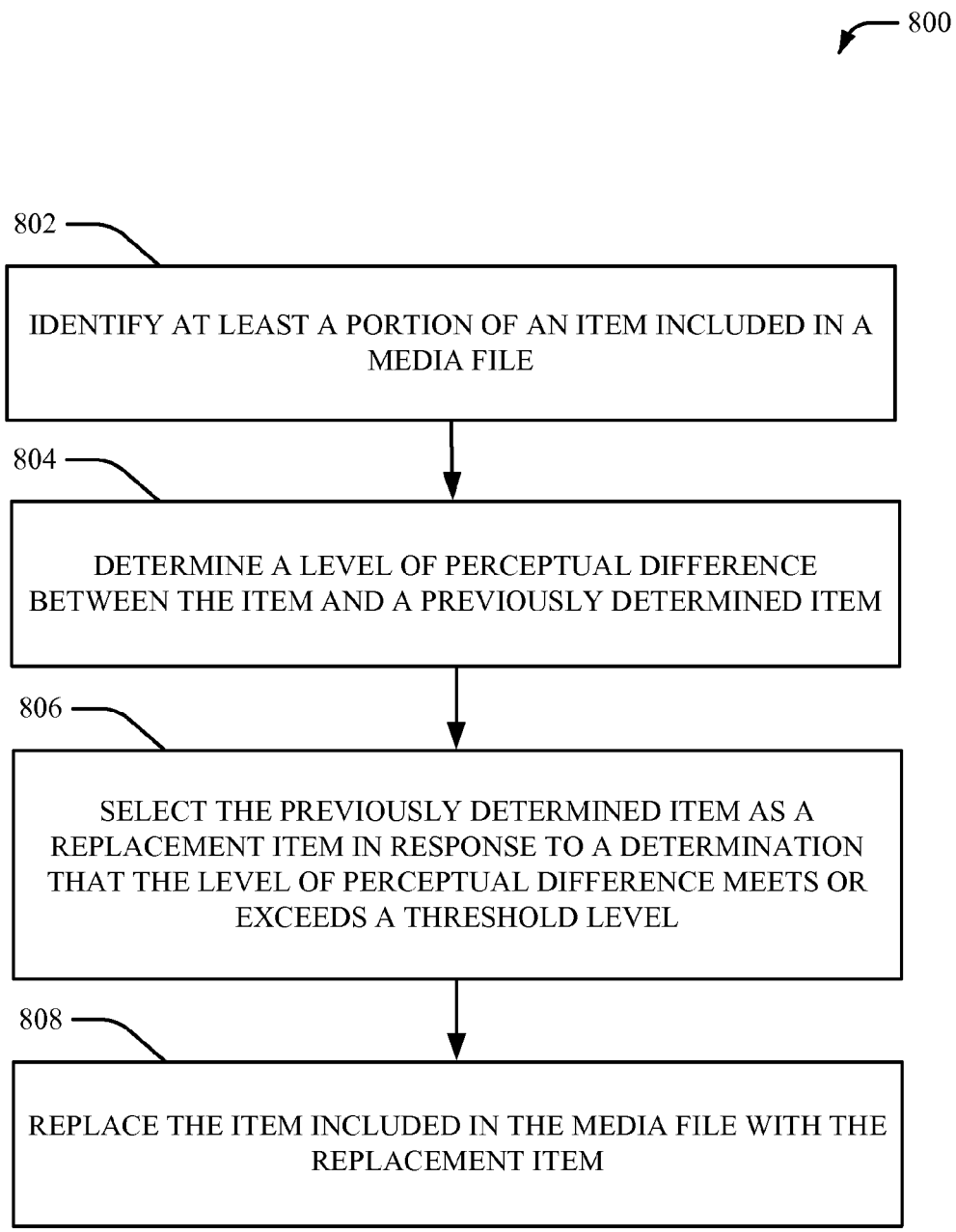
FIG. 8 depicts a flow diagram of another example method for replacing an item in a media file, in accordance with various aspects and implementations described herein.

Referring to FIG. 8, there illustrated is an example methodology 800 for replacing an item in a media file. At 802, at least a portion of an item included in a media file is identified (e.g., by an identification component 104). In one example, the item can be audio content (e.g., a song) and the media file can be a video file. At 804, a level of perceptual difference between the item and a previously determined item is determined (e.g., by matching component 106). For example, a level of perceptual difference between the item and a previously determined item can be determined based on perceptual characteristics (e.g., timbre, tempo, dynamics, harmony and/or other perceptual characteristics) associated with audio content of the item and audio content of the previously determined item. In an aspect, a level of perceptual difference between the item and a previously determined item can be determined based on frequency coefficient information (e.g., MFCC information) and/or auditory imagery information (e.g., SAI information) associated with audio content of the item and audio content of the previously determined item.

At 806, the previously determined item is selected as a replacement item in response to a determination that the level of perceptual difference meets or exceeds a threshold level (e.g., by matching component 106). For example, the previously determined item can be selected as a candidate item in response to a determination based on perceptual characteristics that the previously determined item is a previously determined item from a set of previously determined items that is most similar to the item in the media file. In one example, the previously determined item can be selected based on perceptual characteristics (e.g., perceptual characteristics associated with audio content of the item and audio content of the previously determined item) and user input. At 808, the item included in the media file is replaced with the replacement item (e.g., by a replacement component 108). For example, a modified media file can be generated by removing the item from the media file and embedding the replacement item into the media file.

Figure 9:
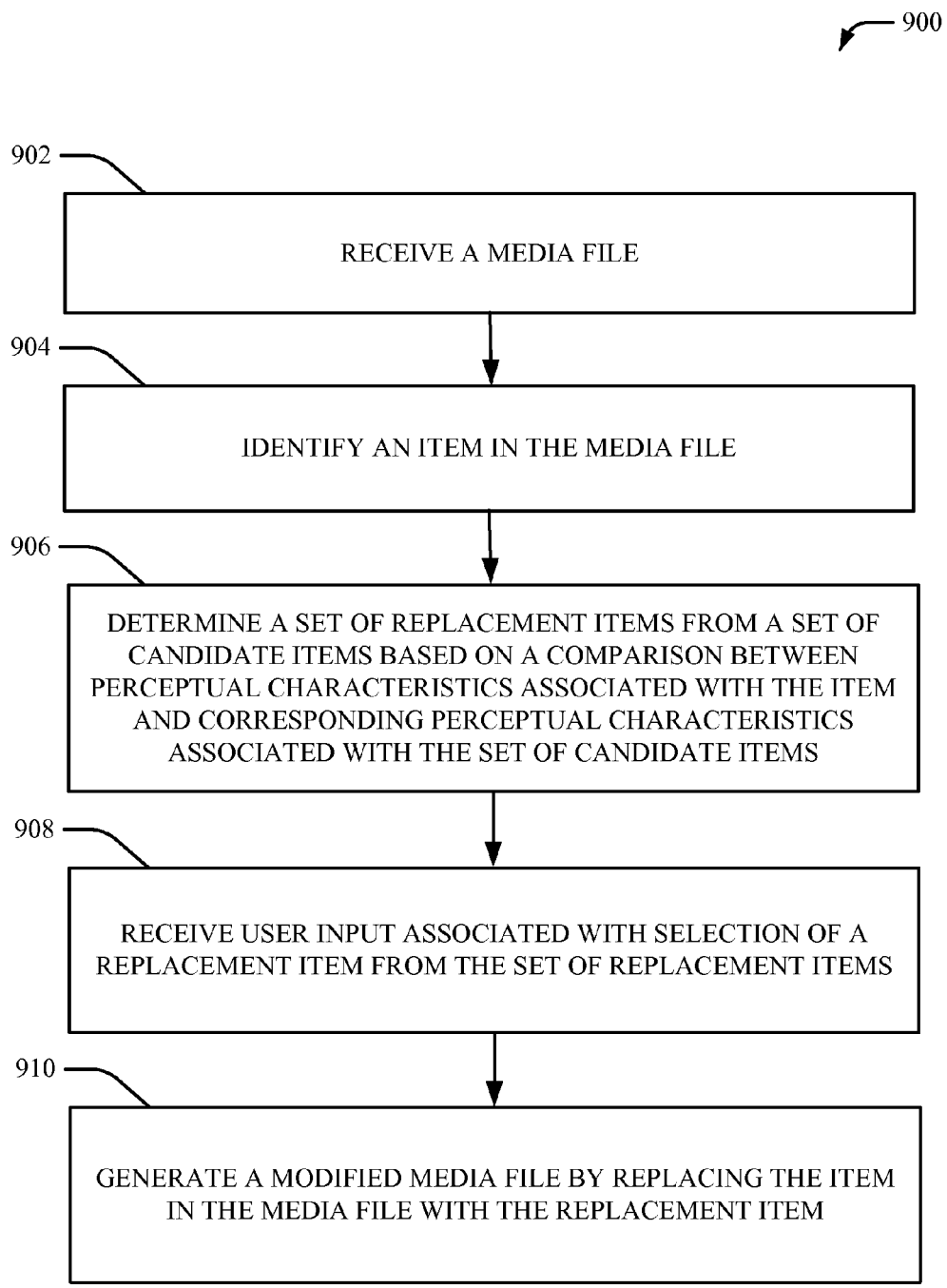
FIG. 9 depicts a flow diagram of an example method for generating a modified media file, in accordance with various aspects and implementations described herein.

Referring to FIG. 9, there illustrated is an example methodology 900 for generating a modified media file. At 902, a media file is received (e.g., by an identification component 104). At 904, an item in the media file is identified (e.g., by an identification component 104). At 906, a set of replacement items from a set of candidate items is determined (e.g., by a matching component 106) based on a comparison between perceptual characteristics associated with the item and corresponding perceptual characteristics associated with the set of candidate items. At 908, user input associated with selection of a replacement item from the set of replacement items is received (e.g., by a selection component 202). For example, the set of replacement items can be presented on a user device associated with a user. Therefore, the user can select the replacement item from the set of replacement items presented on the user device. At 910, a modified media file is generated by replacing the item in the media file with the replacement item (e.g., using a replacement component 108).

Figure 10:
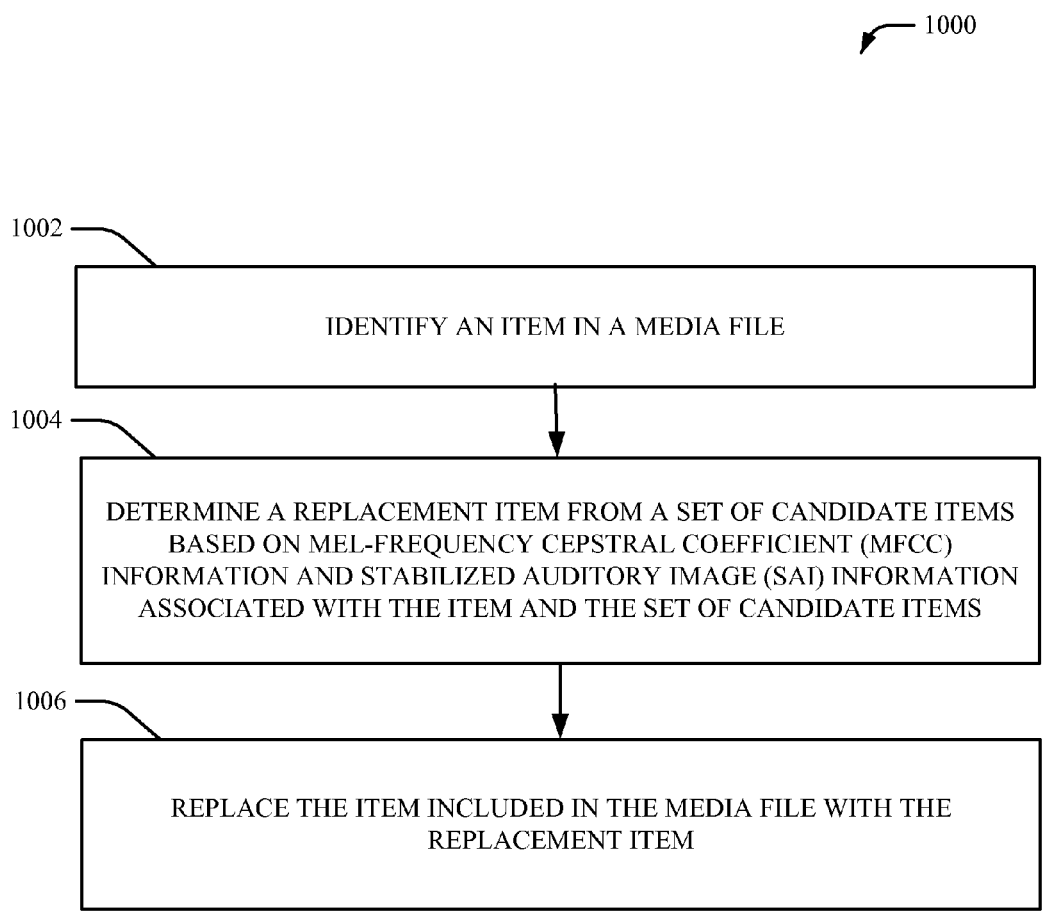
FIG. 10 depicts a flow diagram of yet another example method for replacing an item in a media file, in accordance with various aspects and implementations described herein.

Referring to FIG. 10, there illustrated is an example methodology 1000 for replacing an item in a media file. At 1002, an item in the media file is identified (e.g., by an identification component 104). At 1004, a replacement item from a set of candidate items is determined (e.g., by a matching component 106) based on Mel-Frequency Cepstral Coefficient (MFCC) information and Stabilized Auditory Image (SAI) information associated with the item and the set of candidate items. For example, MFCC information and SAI information can be employed to match the item in the media file with one or more candidate items from a set of candidate items. The replacement item can be a candidate item from the set of candidate item that is determined to match (e.g., be similar to) the item in the media file based on the MFCC information and the SAI information. At 1006, the item included in the media file is replaced (e.g., by a replacement component 108) with the replacement item.

Figure 11:
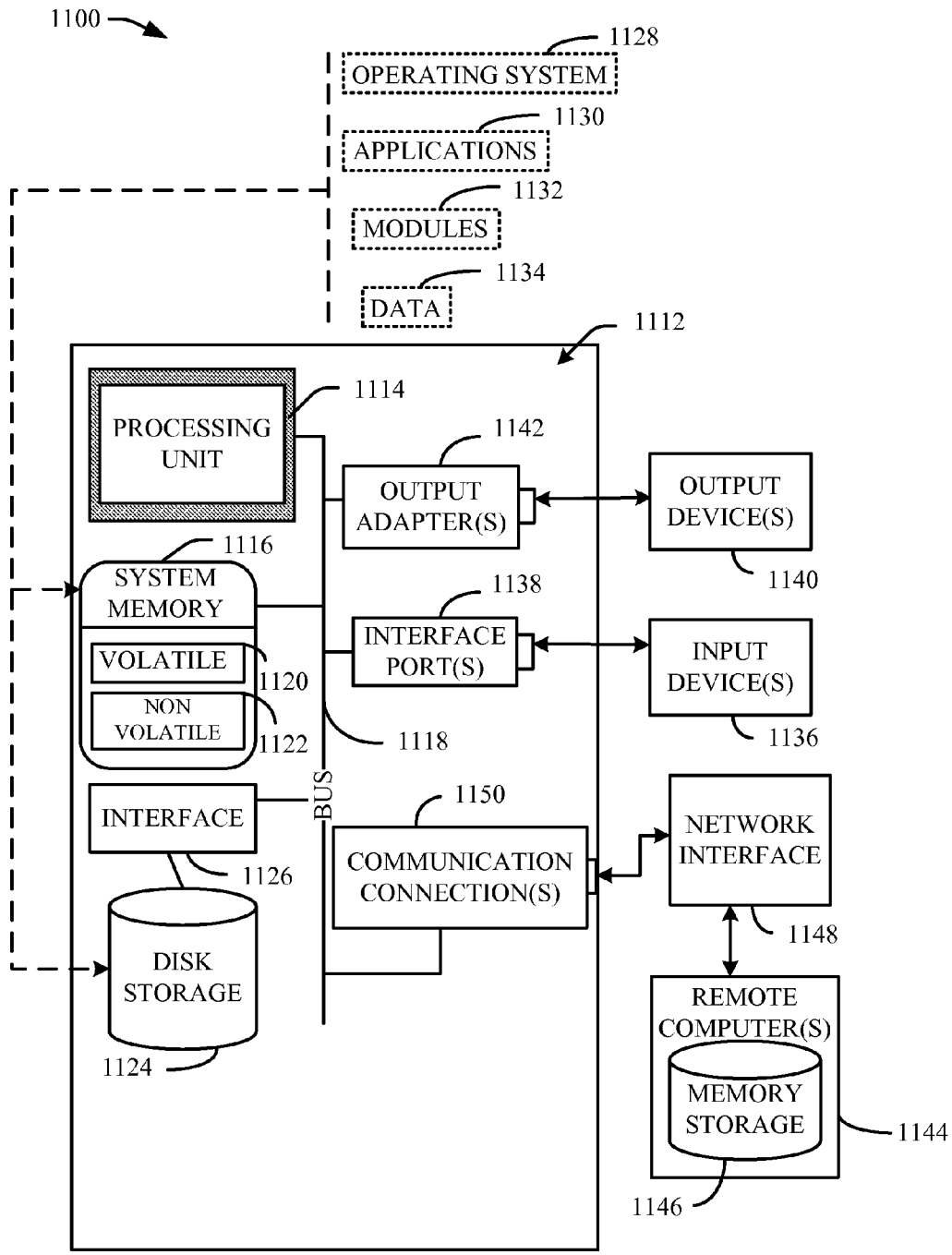
FIG. 11 is a schematic block diagram illustrating a suitable operating environment.
Figure 12:
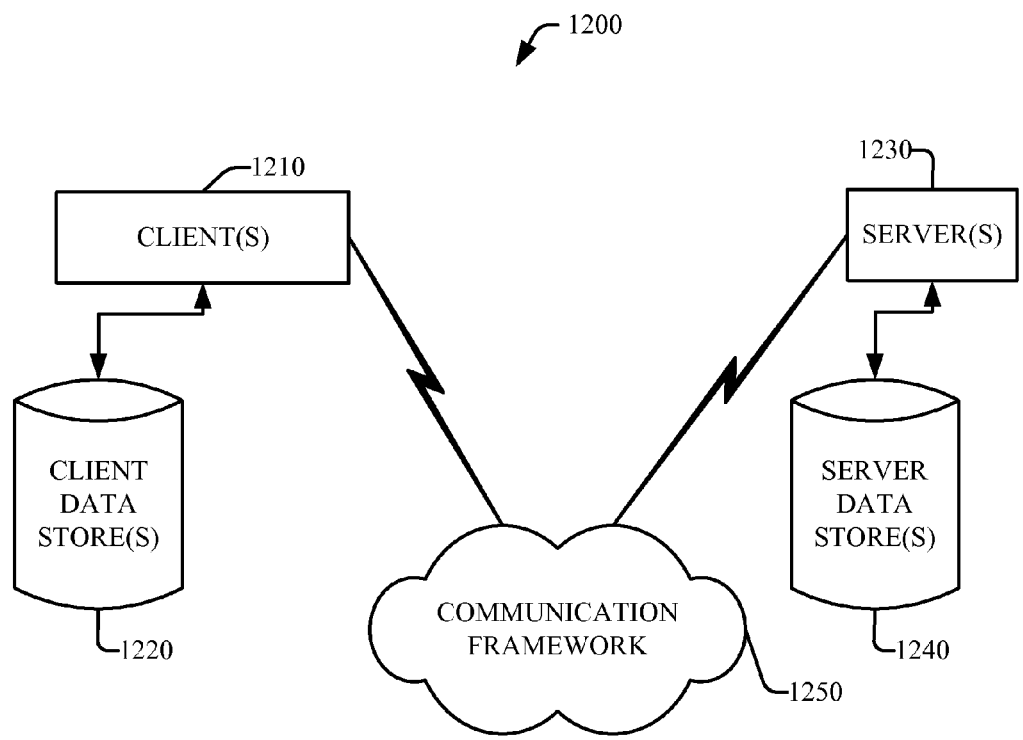
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., media modification component, identification component, matching component, replacement component, selection component, MFCC component, SAI component, interface component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory storing computer executable instructions; and
    a processor that, when executing the computer executable instructions stored in the memory, is programmed to:
        receive, at a server from a user device, a media file;
        identify at least a portion of an item in the media file;
        determine, by the server, a replacement item from a set of candidate items stored on the server, wherein the set of candidate items is scored based on a comparison between a weighted average of frequency coefficients and auditory imagery information associated with the item and a weighted average of frequency coefficients and auditory imagery information associated with each candidate item of the set of candidate items;
        cause a user interface to be presented on the user device that indicates the item in the media file, the replacement item, and information indicating one or more outcomes associated with not replacing the item with the replacement item in the media file;
        receive, via the user interface, permission to replace the item with the replacement item in the media file;
        in response to receiving the permission to replace the item with the replacement item, generate a modified media file by replacing the item in the media file with at least a portion of the replacement item; and
        causing the modified media file to be presented on a second user device.

2. The system of claim 1, wherein the processor is further programmed to receive user input associated with selection of the replacement item.

3. The system of claim 2, wherein the processor is further programmed to replace the item in the media file with at least the portion of the replacement item based on the selection.

4. The system of claim 1, wherein the processor is further programmed to determine the replacement item from the set of candidate items based on a comparison between timbre characteristics associated with the item and timbre characteristics associated with the set of candidate items.

5. The system of claim 1, wherein the processor is further programmed to determine the replacement item from the set of candidate items based on a comparison between tempo characteristics associated with the item and tempo characteristics associated with the set of candidate items.

6. The system of claim 1, wherein the processor is further programmed to determine the replacement item from the set of candidate items based on a comparison between harmonic characteristics associated with the item and harmonic characteristics associated with the set of candidate items.

7. The system of claim 1, wherein the processor is further programmed to determine the replacement item from the set of candidate items based on a comparison between dynamic characteristics associated with the item and dynamic characteristics associated with the set of candidate items.

8. The system of claim 1, wherein the processor is further programmed to temporally synchronize at least the portion of the replacement item and the media file based on an interval of time associated with at least the portion of the item.

9. A method, comprising:
    employing a processor that facilitates execution of computer executable instructions stored on a non-transitory computer readable medium to implement operations, comprising:
        receiving, at a server from a user device, a media file;
        identifying at least a portion of an item included in the media file;
        determining, by the server, a level of perceptual difference between the item and a previously determined item that is stored on the server, based on a comparison between a weighted average of frequency coefficients and auditory imagery information associated with the item and a weighted average of frequency coefficients and auditory imagery information associated with the previously determined item;
        selecting the previously determined item as a replacement item in response to a determination that the level of perceptual difference meets or exceeds a threshold level;
        causing a user interface to be presented on the user device that indicates the item in the media file, the replacement item, and information indicating one or more outcomes associated with not replacing the item with the replacement item in the media file;

receiving, via the user interface, permission to replace the item with the replacement item in the media file;

in response to receiving the permission to replace the item with the replacement item, generating a modified media file by replacing the item included in the media file with the replacement item; and causing the modified media file to be presented on a second user device.

10. The method of claim 9, further comprising:

receiving user input associated with selection of the replacement item.

11. The method of claim 10, wherein the replacing comprises replacing the item included in the media file with the replacement item based on the selection.

12. The method of claim 9, wherein the determining comprises determining the level of perceptual difference based on a comparison between timbre characteristics associated with the item and timbre characteristics associated with the previously determined item.

13. The method of claim 9, wherein the determining comprises determining the level of perceptual difference based on a comparison between tempo characteristics associated with the item and tempo characteristics associated with the previously determined item.

14. The method of claim 9, wherein the determining comprises determining the level of perceptual difference based on a comparison between harmonic characteristics associated with the item and harmonic characteristics associated with the previously determined item.

15. The method of claim 9, wherein the determining comprises determining the level of perceptual difference based on a comparison between dynamic characteristics associated with the item and dynamic characteristics associated with the previously determined item.

16. A non-transitory computer readable storage medium comprising computer-executable instructions, that in response to execution, cause a computing system to perform operations, comprising:

receiving, at a server from a user device, a media file;

identifying at least a portion of an audio item in a media file;

determining, by the server, a set of replacement audio items from a set of previously determined audio items stored on the server, wherein the set of previously determined audio items is scored based on a comparison between a weighted average of frequency coefficients and auditory imagery information associated with the audio item and a weighted average of frequency coefficients and auditory imagery information associated with each previously determined audio item of the set of previously determined audio items;

causing a user interface to be presented on the user device that indicates the audio item in the media file, the set of replacement audio items, and information indicating one or more outcomes associated with not replacing the audio item in the media file with a replacement item from the replacement audio items;

receiving, via the user interface, permission to replace the audio item in the media file with one of the set of replacement audio items;

generating a modified media file by replacing the audio item in the media file with the one of the set of replacement audio items; and causing the modified media file to be presented on a second user device.

* * * * *